United States Patent [19]

Udagawa

[11] Patent Number: 5,199,723
[45] Date of Patent: Apr. 6, 1993

[54] STEEL LAMINATE GASKET WITH SEAL PROTECTING MEMBER

[75] Inventor: Tsunekazu Udagawa, Ichikawa, Japan

[73] Assignee: Ishikawa Gasket Co., Ltd., Tokyo, Japan

[21] Appl. No.: 866,121

[22] Filed: Apr. 7, 1992

Related U.S. Application Data

[63] Continuation of Ser. No. 611,703, Nov. 13, 1990, abandoned.

[51] Int. Cl.⁵ .................................................. F16J 15/08
[52] U.S. Cl. .................................... 277/235 B; 277/236
[58] Field of Search ................... 277/235 B, 232, 234, 277/236, 180

[56] References Cited

U.S. PATENT DOCUMENTS

| | | | |
|---|---|---|---|
| 1,985,473 | 12/1934 | Victor | 277/235 B |
| 3,737,169 | 6/1973 | Glynn | 277/235 B |
| 4,103,913 | 8/1978 | McDowell | 277/235 B |
| 4,196,913 | 4/1980 | Oka | 277/235 B |
| 4,759,556 | 7/1988 | Udagawa | 277/235 B |
| 4,791,897 | 12/1988 | Udagawa | 277/235 B |
| 4,834,399 | 5/1989 | Udagawa | 277/235 B |
| 4,867,462 | 9/1989 | Udagawa | 277/235 B |
| 4,915,398 | 4/1990 | Kitigawa | 277/235 B |
| 5,004,250 | 4/1991 | Udagawa | |

FOREIGN PATENT DOCUMENTS

| | | | |
|---|---|---|---|
| 0977382 | 11/1975 | Canada | 277/235 B |
| 2176450 | 10/1973 | France | |
| 0255254 | 11/1986 | Japan | 277/235 B |
| 0177363 | 8/1987 | Japan | 277/235 B |
| 0083843 | 3/1989 | Japan | 277/235 B |
| 63-12261 | 8/1989 | Japan | |
| 63-20827 | 8/1989 | Japan | |
| 63-53125 | 10/1989 | Japan | |
| 0268267 | 5/1950 | Switzerland | 277/235 B |
| 0697854 | 9/1953 | United Kingdom | 277/235 B |

Primary Examiner—William A. Cushlinski, Jr.
Assistant Examiner—Daniel G. DePumpo
Attorney, Agent, or Firm—Kanesaka and Takeuchi

[57] ABSTRACT

A steel laminate gasket of the invention is installed in an internal combustion engine having at least one fluid hole therein. The gasket includes a plurality of plates for constituting the steel laminate gasket having at least one hole corresponding to the fluid hole of the engine, and a sealing device to seal around the fluid hole of the engine. A supporting device integrally formed on one of the plates is situated between a gasket edge portion and a part of the sealing device facing the gasket edge portion. Consequently, when the engine is operated, vibration of the gasket at the gasket edge portion is reduced.

14 Claims, 2 Drawing Sheets

STEEL LAMINATE GASKET WITH SEAL PROTECTING MEMBER

This application is a continuation of application Ser. No. 611,703, filed Nov. 13, 1990, now abandoned.

BACKGROUND OF THE INVENTION AND RELATED ART STATEMENT

The present invention relates to a steel laminate gasket with a seal protecting member near the outer periphery of the gasket.

A gasket is installed between two engine parts to seal therebetween. In order to securely seal around a hole of the engine parts, the gasket is provided with sealing means around the hole, which provides high surface pressure when the gasket is tightened.

When an engine is operated, the engine together with the gasket vibrates, wherein the vibration is especially severe at a periphery of the gasket. Especially, a cylinder head gasket receives a severe vibration at the periphery thereof.

When the gasket vibrates, sealing pressure applied against the sealing means around the hole changes repeatedly. As a result, when the gasket is used for a long period of time, creep relaxation occurs at the sealing means. Also, when coatings are formed on the plates, the coatings may break or gradually flow outwardly by the vibration of the gasket.

In Japanese Utility Model Applications No. 63-12261, No. 63-20827 and No. 63-53125, it was proposed that at least one protecting plate is formed at an edge portion of a gasket near a hole to be sealed, so that vibration of the gasket is reduced. In these inventions, vibration of the gasket is properly reduced, but it requires additional plates.

Accordingly, one object of the present invention is to provide a steel laminate gasket, in which sealing means around a hole is protected from vibration of the gasket.

Another object of the invention is to provide a steel laminate gasket as stated above, wherein creep relaxation of the sealing means is substantially prevented.

A further object of the invention is to provide a steel laminate gasket as stated above, wherein the flow of the seal coating formed on a gasket is substantially prevented.

A still further object of the invention is to provide a steel laminate gasket as stated above, which can be easily and economically manufactured.

Further objects and advantages of the invention will be apparent from the following description of the invention.

SUMMARY OF THE INVENTION

In accordance with the present invention, a steel laminate gasket is installed in an internal combustion engine having at least one fluid hole therein. The gasket is suitable for a cylinder head gasket.

The gasket comprises a plurality of plates for constituting the steel laminate gasket, means for sealing around the fluid hole of the engine, and means for partly supporting the sealing means.

Each plate is provided with a gasket edge portion and at least one hole corresponding to the fluid hole, wherein the hole is located near the gasket edge portion. The supporting means is integrally formed on one of the plates and is situated away from the gasket edge portion near the sealing means facing the gasket edge portion. The supporting means is located at a predetermined distance away from the sealing means and the gasket edge portion.

As a result, the vibration of the gasket at the gasket edge portion is partly supported by the supporting means to thereby protect the gasket. Consequently, creep relaxation of the sealing means is substantially prevented or reduced. Also, in case seal coatings are formed on outer surfaces or between the plates, the seal coatings on and around the sealing means do not flow outwardly. Leakage of fluid around the fluid hole is substantially prevented.

The supporting means is a bead, which provides surface pressure higher than the surface pressure of the sealing means when the gasket is tightened. Also, the sealing means may be a bead integrally formed on one of the plates. Further, the bead for the supporting means may be curved along the bead of the sealing means. The beads for the supporting means and the sealing means may be formed on the same plate or different plate.

DETAILED DESCRIPTION OF PREFERRED EMBODIMENTS

Figure 1:
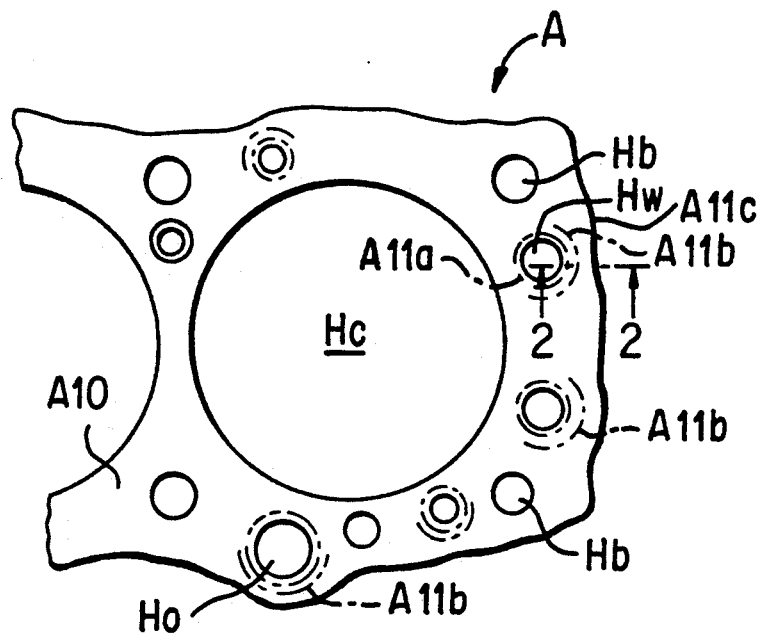
FIG. 1 is a partial plan view of a first embodiment of a steel laminate gasket of the invention.
Figure 2A:
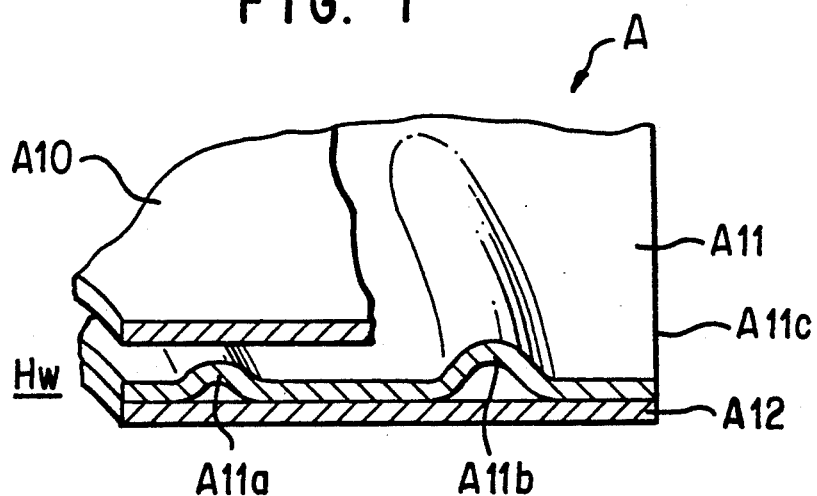
FIG. 2A is an enlarged perspective section view taken along line 2—2 in FIG. 1.

Referring to FIGS. 1 and 2A, a first embodiment A of a steel laminate gasket of the present invention is shown. The gasket A is a cylinder head gasket and includes cylinder holes Hc, water holes Hw, oil holes Ho, bolt holes Hb and so on, as in the conventional gasket.

In the gasket A, areas around the cylinder holes Hc are sealed by appropriate sealing means. However, since the sealing means for the cylinder holes Hc is not the subject matter of the present invention, the sealing means for the cylinder holes Hc is not explained. Any sealing means may be used for the cylinder holes Hc.

Also, in the embodiments explained herein below, areas around the water holes Hw and oil holes Ho are sealed by beads. The beads are preferable, but it is possible to use any other sealing means around the water hole Hw and oil holes Ho.

As shown in FIG. 2A, the gasket A comprises an upper plate A10, a middle plate A11 and a lower plate A12, which have the same configuration and extend over the entire area of the gasket A. The middle plate A11 is situated between the upper and lower plates A10, A12 and includes a bead A11a around the water hole Hw to seal therearound.

The middle plate A11 further includes a bead A11b situated between the bead A11a and an edge A11c. The bead A11b curves generally along the bead A11a and is partly formed outside the bead A11a facing the edge A11c. The height of the bead A11b is higher than that of the bead A11a to provide surface pressure greater than that of the bead A11a when the gasket A is tightened.

Figure 3:
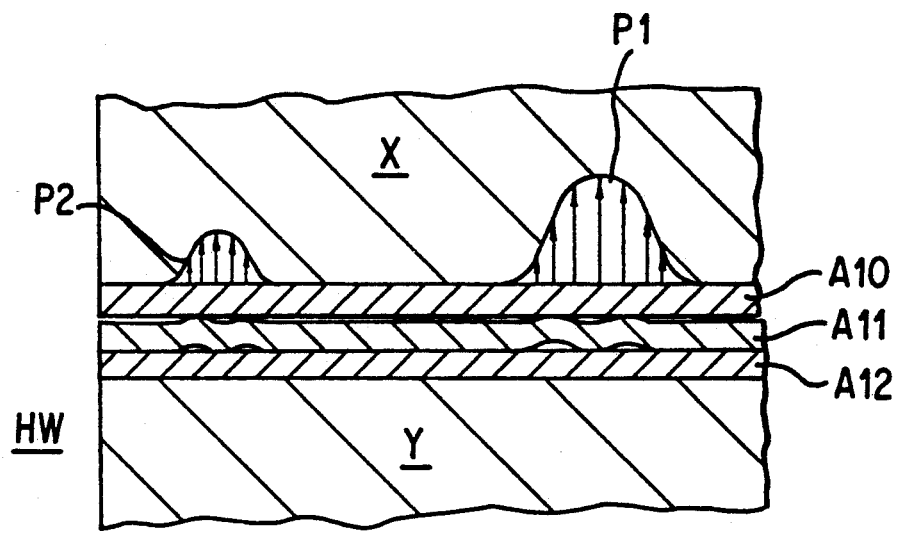
FIG. 3 is an explanatory section view for showing a compressed condition of a gasket.

As clearly shown in FIG. 3, when the gasket A is situated between a cylinder head X and a cylinder block Y and is tightened, the beads A11a, A11b are compressed. The bead A11a seals around the water hole Hw, and the bead A11b partly supports the bead A11a. The bead A11b provides surface pressure $P_1$ higher than surface pressure $P_2$ of the bead A11a. As a result, a part of the bead A11a near the bead A11b or near the edge A11c is supported by the bead A11b.

When an engine is actuated, the engine vibrates. Especially, the edge portions of a cylinder head gasket vibrate severely. As a result of the vibration, the sealing means near the edge portions of the cylinder head gasket is weakened. Further, since high temperature is applied to the cylinder head gasket, the cylinder head gasket is liable to be damaged. Especially, in case seal coatings are formed on or between the plates, the seal coatings on or around the sealing means may break or flow outwardly by the vibration and high temperature.

Figure 2B:
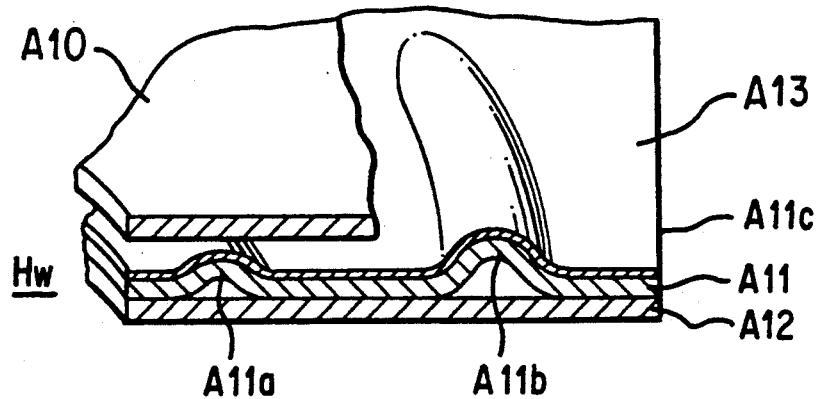
FIG. 2B is a perspective section view similar to FIG. 2A.

In the present invention, the bead A11b is formed between the edge A11c and the bead A11a, and supports a part of the tightening pressure applied to the bead A11a. Therefore, even if the gasket A is used for a long time, the bead A11a is not substantially damaged by the vibration of the engine. Namely, creep relaxation of the bead A11a is substantially prevented. Further, as shown in FIG. 2B, in case of a seal coating A13 is formed on or around the bead A11a, the seal coating may not break or flow outside the bead A11a. Even if the seal coatings flows from the bead A11a, the bead A11b prevents the flow of the seal coating beyond the same. Accordingly, sealing around the water hole Hw can be securely made.

Figure 4:
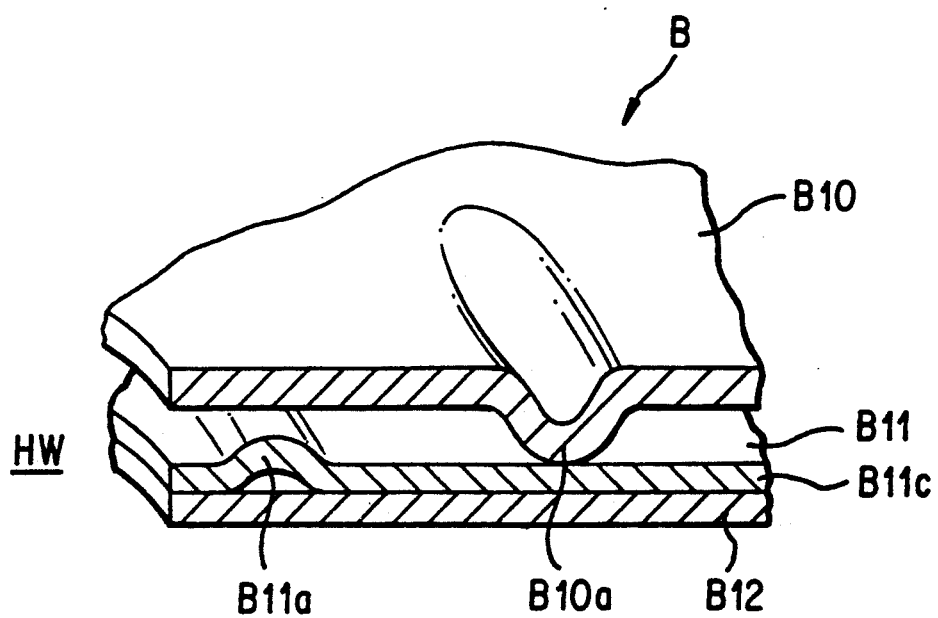
FIG. 4 is an enlarged perspective section view, similar to FIG. 2, for showing a second embodiment of a steel laminate gasket of the invention.

FIG. 4 shows a second embodiment B of a steel laminate gasket of the invention. The gasket B comprises an upper plate B10, a middle plate B11 with a bead B11a, and a lower plate B12, as in the gasket A. However, in the gasket B, the middle plate B11 does not have a bead between an edge B11c and the bead B11a. Instead, the plate B10 is provided with a bead B10a, which is located between the edge B11c and the bead B11a when the gasket B is assembled. The bead B10a partly curves along the bead B11a.

The height of the bead B10a is higher than the height of the bead B11a, and the thickness of the plate B10 is thicker than the plate B11, so that when the gasket B is tightened, the bead B10a provides surface pressure higher than that of the bead B11a. Therefore, the bead B10a partly supports tightening pressure applied to the bead B11a to thereby protect the bead B11a. The hardness of the plate B10 may be greater than the plate B11. The gasket B operates as in the gasket A.

In the present invention, the supporting means is situated near the sealing means at a predetermined distance away from the gasket edge portion. Therefore, when the engine is actuated, vibration of the gasket at the edge portion is significantly reduced. As a result, creep relaxation of the sealing means is substantially prevented. In the case seal coatings are formed on or between the plates, the seal coatings on or around the sealing means do not break or flow outwardly by the vibration of the gasket. Especially, the seal coatings do not flow beyond the supporting means.

While the invention has been explained with reference to the specific embodiments of the invention, the explanation is illustrative and the invention is limited only by the appended claims.

What is claimed is:

1. A steel laminate gasket for an internal combustion engine having at least one cylinder bore and at least one liquid hole arranged near the cylinder bore, comprising,
   a plurality of metal plates for constituting the steel laminate gasket, each plate having a gasket edge portion, at least one first hole corresponding to the cylinder bore and at least one second hole corresponding to the liquid hole of the engine, said second hole being located between the first hole and the gasket edge portion,
   first sealing means for sealing around the cylinder bore of the engine,
   second sealing means for sealing around the liquid hole of the engine, said second sealing means being formed of a bead integrally formed on one of the plates for constituting the metal laminate gasket and entirely surrounding the liquid hole, and
   means for partly supporting the second sealing means situated between the gasket edge portion and a part of the second sealing means facing the gasket edge portion without extending along the entire gasket edge portion, said supporting means being formed of a bead and integrally formed on one of the plates without substantially facing the first sealing means so that the second sealing means does not substantially directly face the gasket edge portion, said supporting means being located adjacent the second sealing means and spaced apart from both the second sealing means and the gasket edge portion so that when the gasket is tightened, the supporting means receives a part of tightening pressure applied to the second sealing means at a side of the gasket edge portion, said bead for the supporting means providing surface pressure at least equal to surface pressure of the second sealing means when the gasket is tightened to protect the second sealing means.

2. A steel laminate gasket according to claim 1, wherein said bead for the supporting means provides the surface pressure higher than the surface pressure of the second sealing means when the gasket is tightened.

3. A steel laminate gasket according to claim 2, wherein said bead for the supporting means is curved along the second sealing means, distances between the bead for the supporting means and the second sealing means being constant.

4. A steel laminate gasket according to claim 3, wherein said bead for the supporting means is formed on the same plate as the bead for the second sealing means.

5. A steel laminate gasket according to claim 1, wherein said bead for the second sealing means is formed on one plate, and said bead for the supporting means is formed on another plate, said beads for the second sealing means and for the supporting means facing against each other.

6. A steel laminate gasket according to claim 5, wherein said plate having the supporting means is thicker than the plate having the second sealing means.

7. A steel laminate gasket according to claim 5, wherein said plate having the supporting means is harder than the plate having the second sealing means.

8. A steel laminate gasket according to claim 5, wherein said bead for the supporting means is continuous.

9. A steel laminate gasket for an internal combustion engine having at least one cylinder bore and one liquid hold situated near the cylinder bore, comprising, a plurality of plates for constituting the steel laminate gasket, each plate having a gasket edge portion, at least one first hole corresponding to the cylinder bore of the engine and at least one second hole corresponding to the liquid hole of the engine, said second hole being located near the gasket edge portion between the first hole and the gasket edge portion, means for preventing fluid from flowing between the plates, said fluid flow preventing means being formed between the plates, sealing means for sealing around the cylinder bore of the engine, a sealing bead formed on one of the plates for sealing around the liquid hole of the engine, said sealing bead, when the gasket is tightened, being compressed to seal therearound, and a supporting bead for partly supporting the sealing bead situated between the gasket edge portion and a part of the sealing bead facing the gasket edge portion without extending along the entire gasket edge portion, said supporting bead being integrally formed on one of the plates without substantially facing the sealing means so that the sealing bead does not substantially directly face the gasket edge portion, said supporting bead being located adjacent the sealing bead and spaced apart from both the sealing bead and the gasket edge portion so that when the gasket is tightened, the supporting bead receives a part of tightening pressure applied to the sealing bead to protect the sealing bead, and when the fluid flow preventing means formed between the plates flows toward the gasket edge portion, said supporting bead prevents the flow of the fluid flow preventing means from flowing beyond the supporting bead to securely seal around the fluid hole.

10. A steel laminate gasket according to claim 9, wherein said supporting bead provides surface pressure at least equal to surface pressure of the sealing bead when the gasket is tightened.

11. A steel laminate gasket according to claim 9, wherein said sealing bead is formed on one plate, and said supporting bead is formed on another plate, said sealing bead and the supporting bead facing against each other.

12. A steel laminate gasket according to claim 9, wherein said supporting bead is continuous.

13. A steel laminate gasket according to claim 9, wherein said supporting bead is curved along the sealing bead, distances between the supporting bead and the sealing bead being constant.

14. A steel laminate gasket according to claim 9, wherein said fluid flow preventing means directly contacts the supporting bead to directly prevent the flow of the fluid flow preventing means.

* * * * *

UNITED STATES PATENT AND TRADEMARK OFFICE
CERTIFICATE OF CORRECTION

PATENT NO. : 5,199,723

DATED : April 6, 1993

INVENTOR(S) : Tsunekazu Udagawa

It is certified that error appears in the above-identified patent and that said Letters Patent is hereby corrected as shown below:

```
Column 3, line 26, change "in case of"  to --in case--:
         line 29, change "coatings" to --coating--; and
         line 59, change "In the case seal" to --In case the seal--.
Column 4, line 68, change "hold" to --hole--.
Column 6, line 3, change "the" to --said--.
```

Signed and Sealed this

Twenty-third Day of November, 1993

Attest:

BRUCE LEHMAN

Attesting Officer

Commissioner of Patents and Trademarks